(12) United States Patent
Setiawan et al.

(10) Patent No.: US 10,861,469 B2
(45) Date of Patent: Dec. 8, 2020

(54) APPARATUSES AND METHODS FOR ENCODING AND DECODING A MULTICHANNEL AUDIO SIGNAL

(71) Applicant: Huawei Technologies Duesseldorf GmbH, Duesseldorf (DE)

(72) Inventors: Panji Setiawan, Munich (DE); Jacek Konieczny, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 166 days.

(21) Appl. No.: 16/230,009

(22) Filed: Dec. 21, 2018

(65) Prior Publication Data

US 2019/0122677 A1    Apr. 25, 2019

Related U.S. Application Data

(63) Continuation of application No. PCT/EP2016/065363, filed on Jun. 30, 2016.

(51) Int. Cl.
*G10L 19/008* (2013.01)
*G06F 16/683* (2019.01)

(52) U.S. Cl.
CPC .......... *G10L 19/008* (2013.01); *G06F 16/683* (2019.01)

(58) Field of Classification Search
CPC .............................. G10L 19/008; G06F 16/683
See application file for complete search history.

(56) References Cited

U.S. PATENT DOCUMENTS

| | | | | |
|---|---|---|---|---|
| 2008/0249976 | A1* | 10/2008 | Ojanpera | G11B 27/28 |
| 2009/0282218 | A1* | 11/2009 | Raichelgauz | G06F 16/433 |
| | | | | 712/36 |
| 2011/0066434 | A1* | 3/2011 | Li | G10L 15/10 |
| | | | | 704/241 |
| 2016/0148618 | A1* | 5/2016 | Huang | G10L 19/005 |
| | | | | 381/2 |

(Continued)

OTHER PUBLICATIONS

Yang et al., "High-Fidelity Multichannel Audio Coding With Karhunen-Loève Transform," IEEE Transactions on Speech and Audio Processing, vol. 11, No. 4, Institute of Electrical and Electronics Engineers, New York, New York (Jul. 2003).

(Continued)

*Primary Examiner* — Bryan S Blankenagel
(74) *Attorney, Agent, or Firm* — Leydig, Voit & Mayer, Ltd.

(57) ABSTRACT

The disclosure relates to an apparatus for encoding an input audio signal, wherein the input audio signal comprises a plurality of input audio channels. The apparatus comprises a KLT-based pre-processor configured to transform the plurality of input audio channels into a plurality of eigenchannels and to provide metadata in the form of a plurality of metadata elements, wherein the metadata allows reconstructing the plurality of input audio channels on the basis of the plurality of eigenchannels, a metadata re-arrangement unit configured to re-arrange the plurality of metadata elements on the basis of a re-arrangement scheme into one or more metadata blocks, wherein each of the one or more metadata blocks is a multi-dimensional array, and a metadata encoder configured to encode each of the one or more metadata blocks.

15 Claims, 7 Drawing Sheets

(56) References Cited

U.S. PATENT DOCUMENTS

| | | | | |
|---|---|---|---|---|
| 2016/0155448 A1* | 6/2016 | Purnhagen | ............ | G10L 19/008 704/204 |
| 2017/0103775 A1* | 4/2017 | Xu | ......................... | H04R 3/005 |

OTHER PUBLICATIONS

Liu et al., "Spatial Parameter Decision by Dynamic Programming in Parametric Stereo Coding and MPEG Surround," AES 126th Convention, Munich, Germany, XP040509013, Audio Engineering Society, (May 7-10, 2009).

Beracoechea et al., "Overview of Coding Alternatives for Virtual Acoustic Opening Based Applications," AES 28th International Conference, Pitea, Sweden, XP040507935, Audio Engineering Society (Jun. 30-Jul. 2, 2006).

Lindstrom, "Fixed-Rate Compressed Floating-Point Arrays," IEEE Transactions on Visualization and Computer Graphics, vol. 20, No. 12, Institute of Electrical and Electronics Engineers, New York, New York (Dec. 2014).

"Frequently asked Questions about Dolby Digital," Dolby, pp. 1-16 (2000).

Valin et al., "High-Quality, Low-Delay Music Coding in the Opus Codec," 135th AES Convention, New York, USA, Audio Engineering Society (Oct. 17-20, 2013).

Neuendorf et al., "The ISO/MPEG Unified Speech and Audio Coding Standard—Consistent High Quality for all Content Types and at all Bit Rates," J. Audio Eng. Soc., vol. 61, No. 12, pp. 956-977 (Dec. 2013).

"Figures" 3GPP TS 26.445 V13.1.0, pp. 1-15, 3rd Generation Partnership Project, Valbonne, France (Mar. 2016).

"3rd Generation Partnership Project; Technical Specification Group Services and System Aspects; Codec for Enhanced Voice Services (EVS); Detailed Algorithmic Description(Release 13)," 3GPP TS 26.445 V13.1.0, pp. 1-655, 3rd Generation Partnership Project, Valbonne, France (Mar. 2016).

"Dolby® Atmos® Next-Generation Audio for Cinema," Issue 3, Dolby (2014).

"Em32 Eigenmike® microphone array release notes (v18.0), Notes for setting up and using the mh acoustics em32 Eigenmike® microphone array," mh acoustics (Jun. 18, 2014).

Herre et al., "MPEG-FH 3D Audio—The New Standard for Coding of Immersive Spatial Audio," IEEE Journal of Selected Topics in Signal Processing, vol. 9, No. 5, pp. 770-779, Institute of Electrical and Electronics Engineers, New York, New York (Aug. 2015).

"Multichannel sound technology in home and broadcasting applications," Report ITU-R BS Series, Broadcasting service(sound), International Telecommunication Union, Geneva, Switzerland (May 2012).

* cited by examiner

APPARATUSES AND METHODS FOR ENCODING AND DECODING A MULTICHANNEL AUDIO SIGNAL

CROSS-REFERENCE TO RELATED APPLICATIONS

This application is a continuation of International Application No. PCT/EP2016/065363, filed on Jun. 30, 2016, the disclosure of which is hereby incorporated by reference in its entirety.

TECHNICAL FIELD

The present disclosure relates to the field of audio signal processing. More specifically, the present disclosure relates to apparatuses and methods for encoding and decoding a multichannel audio signal on the basis of the Karhunen-Loève Transform (KLT).

BACKGROUND

In the field of multichannel spatial audio coding the two following challenges will most likely become more prominent in the future: (i) processing an input audio signal with an arbitrary number of recorded audio channels and (ii) handling a plurality of arbitrarily placed microphones, in particular with respect to angles. One reason for this development is the current trend toward more and more advanced audio recording devices, such as the Eigenmike. Moreover, another current trend is the use of various conventional recording devices at the same time for producing a multichannel audio signal. Thus, there is a need for a generic audio coding scheme that is able to meet the challenges mentioned above.

Currently, activities in multichannel audio coding for streaming and storage purposes are gaining popularity due to the many possible new applications in the field of immersive sound, such as applications for cinemas, virtual reality, telepresence and the like. Exemplary current multichannel audio codecs are Dolby Atmos using a multichannel object based coding, MPEG-H 3D Audio, which incorporates channel objects and Ambisonics-based coding. These current existing multichannel codecs, however, are still limited to some specific numbers of audio channel, such as 5.1, 7.1 or 22.2 channels, as required by industrial standards, such as ITU-RBS.2159-4.

An approach for processing an input audio signal with an arbitrary number of recorded audio channels is based on the Karhunen-Loève Transform (KLT), as disclosed in Yang et al., "High-Fidelity Multichannel Audio Coding with Karhunen-Loève Transform", IEEE Trans. on Speech and Audio Proc., Vol. 11, No. 4, July 2003. Conventional KLT-based audio coding approaches have the drawback that generally a high metadata bitrate is required for allowing reconstructing the original audio signal with a sufficient perceptual quality on the basis of the compressed audio signal. This is because there is a trade-off between the audio quality and the metadata bitrate, wherein a higher metadata bitrate implies a better audio quality and vice versa. Thus, lowering the metadata bitrate will eventually affect the compressed audio quality.

In the article by Yang et al. it is suggested to compress the metadata using a Vector Quantizer (VG), which is a 1-D compression technique namely Vector Quantizer (VQ). This approach, however, has the following drawbacks. It is generally not suited for an arbitrary number of multichannel input audio signals. It is very difficult to obtain good VQ codebooks (training). Implementing a VQ architecture is rather difficult. A very crude representation is provided in case of a small codebook size.

Thus, there is a need for an improved KLT-based apparatus and method for encoding a multichannel audio signal, which in comparison to conventional apparatuses and methods provides an improved metadata compression scheme providing an improved audio quality for similar or lower metadata bitrates.

SUMMARY

It is an object of the disclosure to provide improved apparatuses and methods for encoding and decoding a multichannel audio signal.

The foregoing and other objects are achieved by the subject matter of the independent claims. Further implementation forms are apparent from the dependent claims, the description and the figures.

According to a first aspect the disclosure relates to an apparatus for encoding an input audio signal, wherein the input audio signal is a multichannel audio signal, i.e. comprises a plurality of input audio channels. The apparatus comprises a pre-processor based on the Karhunen-Loève transform (KLT), i.e. a KLT-based pre-processor. The KLT-based pre-processor is configured to transform the plurality of input audio channels into a plurality of eigenchannels and to provide metadata in the form of a plurality of metadata elements, wherein the metadata allows reconstructing the plurality of input audio channels on the basis of the plurality of eigenchannels. The apparatus further comprises a metadata re-arrangement unit configured to re-arrange the plurality of metadata elements on the basis of a re-arrangement scheme into one or more metadata blocks, wherein each of the one or more metadata blocks is a multi-dimensional array. The apparatus further comprises a metadata encoder configured to encode each of the one or more metadata blocks. In an implementation form, the apparatus can further comprise an eigenchannel encoder configured to encode one or more of the eigenchannels. The compression ratio can thereby be increased.

The metadata blocks may all have the same dimensions. This facilitates efficient processing. For example, each of the one or more metadata blocks may be a D-dimensional array, wherein D equals two, three, or four. The metadata blocks may notably be square or cubic (for any number of D), as this may result in a particularly high compression ratio.

In a first implementation form of the apparatus according to the first aspect as such, the re-arrangement scheme is based on a set of correlation values, each of the correlation values being the value of a correlation between two or more metadata elements of the plurality of metadata elements. The compression ratio can thereby be increased.

In a second implementation form of the apparatus according to the first implementation form of the first aspect, the apparatus further comprises a machine learning unit (also referred to as the learning unit) configured to determine the set of correlation values based on a set of training input audio signals. Furthermore, the correlation values determined on the basis of the set of training input audio signals can be updated during a deployment phase. The compression ratio can thereby be increased.

In a third implementation form of the apparatus according to the first or second implementation form of the first aspect, the re-arrangement scheme is configured to place highly correlated metadata elements close to each other, e.g., next to each other. The compression ratio can thereby be increased. In this context, "close" is used with respect to the distance between two elements of the multidimensional array. For example, in a 2D-array (i.e. a two-dimensional matrix), the distance between an element with indices (i,j) and an element with indices (i',j') is the square-root of (i-i')2+(j-j')2. The symbol ** or ˆ means "to the power of".

In a fourth implementation form of the apparatus according to any one of the first to third implementation form of the first aspect, the re-arrangement scheme is defined to minimize, at least approximately, a cost function, wherein the cost function assigns to each candidate re-arrangement scheme of a set of candidate re-arrangement schemes a respective cost value. The compression ratio can thereby be increased.

In a fifth implementation form of the apparatus according to the fourth implementation form of the first aspect, the cost function is a sum of powers of correlation-distance products. For example, the cost function may be defined as:

$$\Sigma_i |c_i d_i|^2,$$

wherein the index i refers to the i-th subset of metadata elements and runs over all subsets, each subset having the same number of metadata elements (e.g., two, or three, or four), $c_i$ denotes the correlation value of the i-th subset of metadata elements, and $d_i$ denotes a measure of the distances between the metadata elements of the i-th subset according to the re-arrangement scheme. In general, the cost function may also be defined as:

$$\Sigma_i |c_i d_i|^n,$$

wherein n is an integer or real number, such as n=1, 2, . . . or n=0.5, . . . .

In the context of the present disclosure, the correlation value of a subset (e.g., a pair) of metadata elements is understood to be the value of the correlation between the metadata elements of the subset. The correlation between the metadata elements of the subset may, for example, be the sum of pairwise correlations of the metadata elements of the subset.

In a sixth implementation form of the apparatus according to the fourth or the fifth implementation form of the first aspect, the re-arrangement scheme comprises one or more iterations of the following sequence of operations:

defining a set of remaining metadata elements, the set of remaining metadata elements consisting of those metadata elements of the plurality of metadata elements that remain to be re-arranged, i.e. which have not yet been assigned a position with the one or more metadata blocks;

selecting, from the set of remaining metadata elements, the subset of M metadata elements that has the highest correlation value, wherein M is greater than or equal to 2 (here and throughout, the correlation of a subset may be defined as the sum of pairwise correlations of the elements of the subset); and re-arranging the selected subset of M metadata elements into one of the one or more metadata blocks. The compression ratio can thereby be increased using relatively few and simple operations.

In a seventh implementation form of the apparatus according to the sixth implementation form of the first aspect, each of the metadata blocks comprises M elements. The compression ratio can thereby be increased.

In an eighth implementation form of the apparatus according to the fourth or fifth implementation form of the first aspect, the re-arrangement scheme comprises: selecting a first metadata element from the plurality of metadata elements; and re-arranging the first metadata element into a first one of the one or more metadata blocks; and one or more iterations of the following sequence of operations:

defining a set of remaining metadata elements, the set of remaining metadata elements consisting of those metadata elements of the plurality of metadata elements that remain to be re-arranged, i.e. which have not yet been assigned a position within the one or more metadata blocks (the set of remaining metadata elements is a logical construction that is defined here and in the claims for the purpose of explanation; in practice, it may be defined implicitly);

selecting, in the first metadata block, a free position next to an occupied position (an occupied position is an element of the metadata block at which a metadata element has been placed);

selecting, from the set of remaining metadata elements, the metadata element that is most highly correlated with the metadata element at the occupied position; and re-arranging the selected metadata element into the selected free position. The compression ratio can thereby be increased in relatively few and simple operations.

In a ninth implementation form of the apparatus according to the first aspect as such or any one of the first to eighth implementation form thereof, the metadata encoder comprises a block transform unit configured, for each of the one or more metadata blocks, to apply a discrete block transform to the respective metadata block for spatially decorrelating the metadata elements, thereby generating a plurality of transform coefficients of the respective metadata block and to encode the plurality of transform coefficients. The compression ratio can thereby be increased.

In a tenth implementation form of the apparatus according to the ninth implementation form of the first aspect, the metadata encoder is configured, for each of the one more metadata blocks, to re-arrange the arrangement of the plurality of transform coefficients of the respective metadata block, in particular on the basis of the respective magnitudes of the plurality of transform coefficients, thus providing a sequence of transform coefficients, and to efficiently encode the sequence of transform coefficients. The compression ratio can thereby be increased.

In an eleventh implementation form of the apparatus according to any one of the ninth to eleventh implementation form of the first aspect, the discrete block transform is a discrete cosine transform (DCT), a discrete sine transform (DST), or a discrete Fourier transform (DFT). The compression ratio can thereby be increased.

According to a second aspect the disclosure relates to a corresponding apparatus for decoding an input audio signal, wherein the input audio signal comprises encoded metadata. The apparatus comprises a metadata decoder configured to decode the encoded metadata, wherein the encoded metadata comprises metadata elements arranged in one or more metadata blocks, wherein each of the one or more metadata blocks is a multi-dimensional array, a metadata re-arrangement unit configured to re-arrange the plurality of metadata elements on the basis of a re-arrangement scheme, and a KLT-based post-processor configured to provide an output audio signal comprising a plurality of output audio channels on the basis of the plurality of re-arranged metadata elements. The compression ratio can thereby be increased.

Further implementation forms of the decoding apparatus according to the second aspect of the disclosure follow directly from the corresponding implementation forms of the encoding apparatus according to the first aspect of the disclosure.

According to a third aspect the disclosure relates to a method for encoding an input audio signal, wherein the input audio signal comprises a plurality of input audio channels. The method comprises: transforming the plurality of input audio channels into a plurality of eigenchannels and providing metadata in the form of a plurality of metadata elements, wherein the metadata allows reconstructing the plurality of input audio channels on the basis of the plurality of eigenchannels; re-arranging the plurality of metadata elements on the basis of a re-arrangement scheme into one or more metadata blocks, wherein each of the one or more metadata blocks is a multi-dimensional array; and encoding each of the one or more metadata blocks. The compression ratio can thereby be increased.

The encoding method according to the third aspect of the disclosure can be performed by the encoding apparatus according to the first aspect of the disclosure. Further features and implementation forms of the encoding method according to the third aspect of the disclosure result directly from the functionality of the encoding apparatus according to the first aspect of the disclosure and its different implementation forms.

According to a fourth aspect the disclosure relates to a method for decoding an input audio signal, the input audio signal comprising encoded metadata, wherein the method comprises: decoding the encoded metadata, wherein the encoded metadata comprises metadata elements arranged in one or more metadata blocks, wherein each of the one or more metadata blocks is a multi-dimensional array; re-arranging the plurality of metadata elements on the basis of a re-arrangement scheme; and providing an output audio signal comprising a plurality of output audio channels on the basis of the plurality of re-arranged metadata elements. The compression ratio can thereby be increased.

The decoding method according to the fourth aspect of the disclosure can be performed by the decoding apparatus according to the second aspect of the disclosure. Further features and implementation forms of the decoding method according to the fourth aspect of the disclosure result directly from the functionality of the decoding apparatus according to the second aspect of the disclosure and its different implementation forms.

According to a fifth aspect the disclosure relates to a computer program comprising program code for performing the encoding method according to the third aspect of the disclosure or the decoding method according to the fourth aspect of the disclosure when executed on a computer. The compression ratio can thereby be increased.

The disclosure can be implemented in hardware and/or software.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It will be appreciated that the disclosure may be placed in other aspects and that structural or logical changes may be made without departing from the scope of the disclosure. The following detailed description, therefore, is not to be taken in a limiting sense.

For instance, it will be appreciated that a disclosure in connection with a described method will generally also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims, embodiments with functional blocks or processing units are described, which are connected with each other or exchange signals. It will be appreciated that the disclosure also covers embodiments which include additional functional blocks or processing units that are arranged between the functional blocks or processing units of the embodiments described below.

Finally, it is understood that the features of the various exemplary aspects described herein may be combined with each other, unless specifically noted otherwise.

Figure 1:
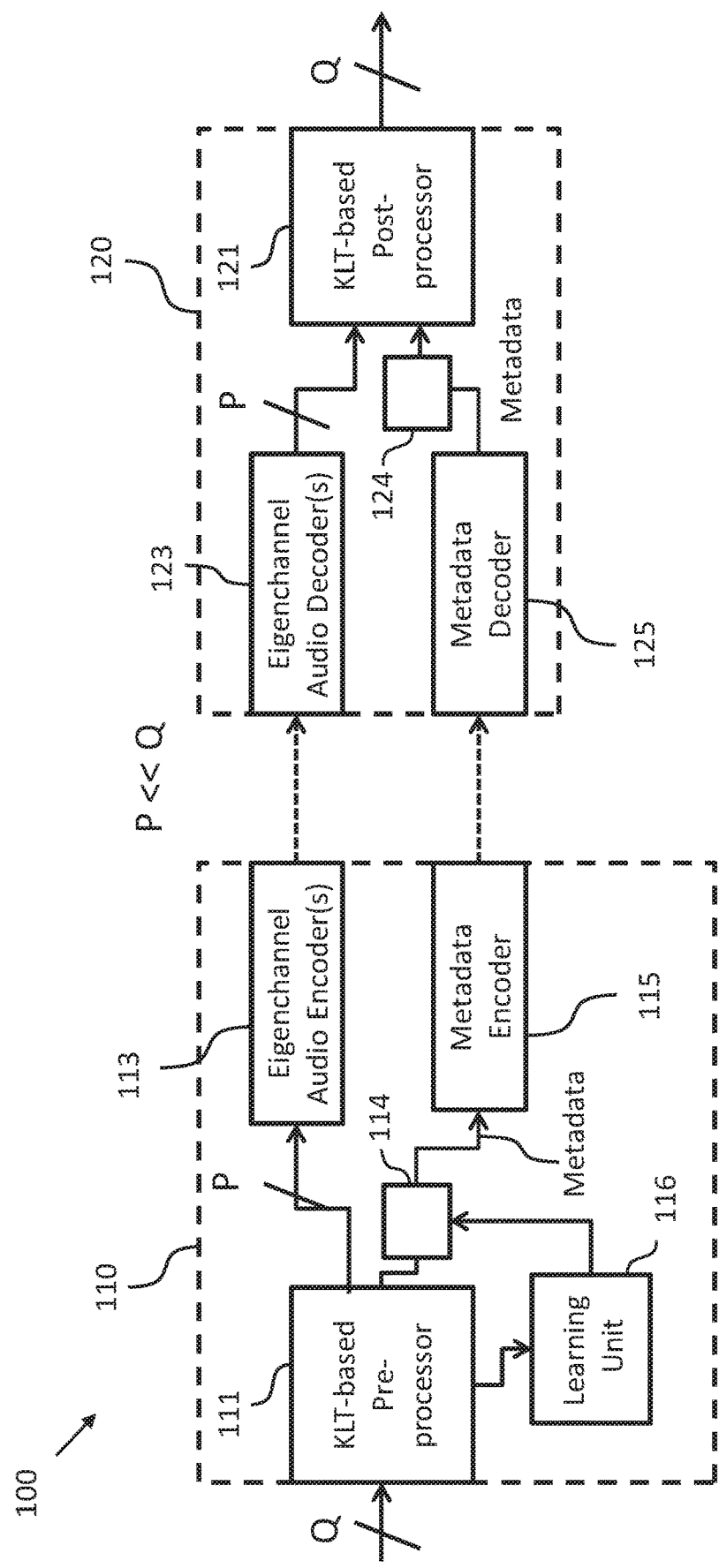
FIG. 1 shows a schematic diagram of a KLT-based audio coding system comprising an apparatus for encoding an audio signal according to an embodiment and an apparatus for decoding the encoded audio signal according to an embodiment.

FIG. 1 shows a schematic diagram of an audio codec system 100 comprising an apparatus 110 for encoding a multichannel audio signal according to an embodiment and an apparatus 120 for decoding the encoded multichannel audio signal according to an embodiment. The encoding apparatus 110 and the decoding apparatus 120 implement a KLT-based audio coding scheme. Further details about this approach are described in Yang et al., "High-Fidelity Multichannel Audio Coding with Karhunen-Loève Transform", IEEE Trans. on Speech and Audio Proc., Vol. 11, No. 4, July 2003, which is hereby incorporated by reference in its entirety.

The encoding apparatus 110 comprises a KLT-based preprocessor 111 configured to transform Q input audio channels into P eigenchannels and to provide metadata in the form of a plurality of metadata elements. The metadata allows reconstructing the plurality of input audio channels on the basis of the plurality of eigenchannels. In an embodiment, the KLT-based pre-processor 111 is configured to provide the metadata in the form of a one-dimensional array of metadata elements. In an embodiment, the metadata comprises non-redundant elements of the covariance matrix associated with the Q input audio channels and/or non-redundant elements of the eigenvectors of the covariance matrix.

The encoding apparatus 110 further comprises a metadata re-arrangement unit 114 configured to re-arrange the plurality of metadata elements on the basis of a re-arrangement scheme into one or more metadata blocks. Each of the one or more metadata blocks is a multi-dimensional array. Different embodiments of re-arrangement schemes that can be implemented in the metadata re-arrangement unit 144 will be described in detail further below.

Moreover, the encoding apparatus 110 comprises a metadata encoder 115 configured to encode each of the one or more metadata blocks.

In the embodiment shown in FIG. 1, the encoding apparatus 110 further comprises an eigenchannel encoder configured to encode the P eigenchannels provided by the KLT-based pre-processor 111.

The decoding apparatus 120 comprises a metadata decoder 125 configured to decode the encoded metadata, wherein the encoded metadata comprises metadata elements arranged in one or more metadata blocks, wherein each of the one or more metadata blocks is a multi-dimensional array. The decoding apparatus 120 further comprises a metadata re-arrangement unit 124 configured to re-arrange the plurality of decoded metadata elements on the basis of a re-arrangement scheme and a KLT-based post-processor 121 configured to provide an output audio signal comprising Q output audio channels on the basis of the plurality of re-arranged decoded metadata elements. In the embodiment shown in FIG. 1, the decoding apparatus 110 further comprises an eigenchannel decoder 123 configured to decode the P eigenchannels provided by the eigenchannel encoder 113 of the encoding apparatus 110.

Figure 2:
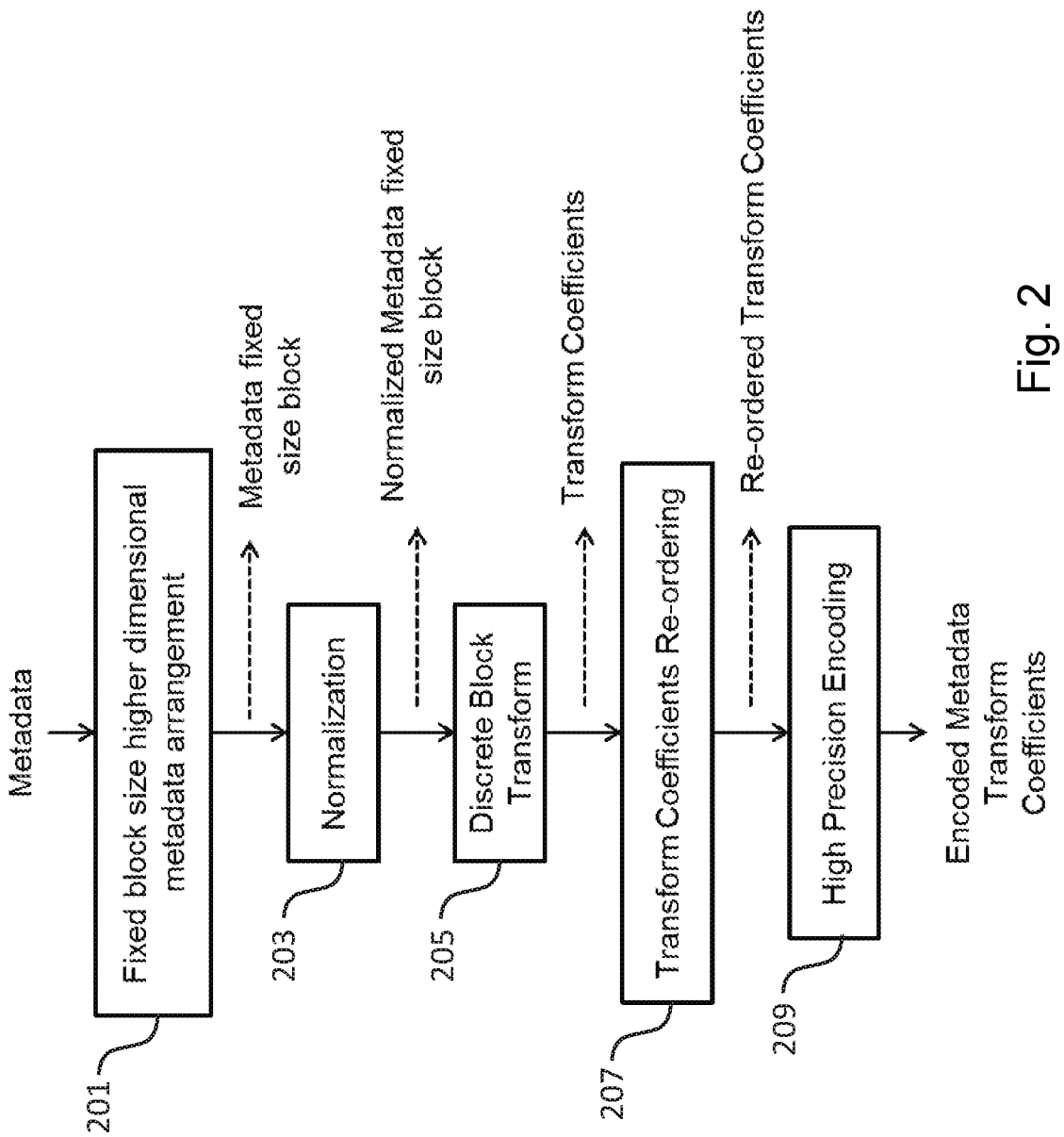
FIG. 2 shows a schematic diagram of a metadata encoding scheme implemented in an apparatus for encoding an audio signal according to an embodiment.

FIG. 2 shows a schematic diagram illustrating a metadata encoding scheme implemented in the encoding apparatus 110 according to an embodiment. In a step 201 fixed block size higher dimensional metadata arrangement is performed so that the metadata is re-arranged on the basis of a re-arrangement scheme into one or more multi-dimensional metadata blocks. As already described above, this step 201 is performed by the metadata re-arrangement unit 114.

The re-arranged metadata elements may be normalized in a step 203. Normalizing increase the compression ratio. A discrete block transform is then applied in step 205 to the one or more multi-dimensional blocks of metadata elements. To this end, in an embodiment, the encoding apparatus 110, in particular the metadata encoder 115 can comprise a block transform unit (not shown in FIG. 1) configured, for each of the one or more metadata blocks, to apply the discrete block transform to the respective metadata block, thereby generating a plurality of transform coefficients of the respective metadata block. In an embodiment, the discrete block transform is a discrete cosine transform (DCT), a discrete sine transform (DST), or a discrete Fourier transform (DFT).

In a step 207 the transform coefficients are reordered on the basis of their respective magnitudes. In an embodiment, the metadata encoder 115 is configured to perform this step for each of the one more metadata blocks, i.e. to re-arrange the plurality of transform coefficients of the respective metadata block.

Finally, in a step 209 the re-arranged transform coefficients are encoded by the metadata encoder 115.

Figure 3:
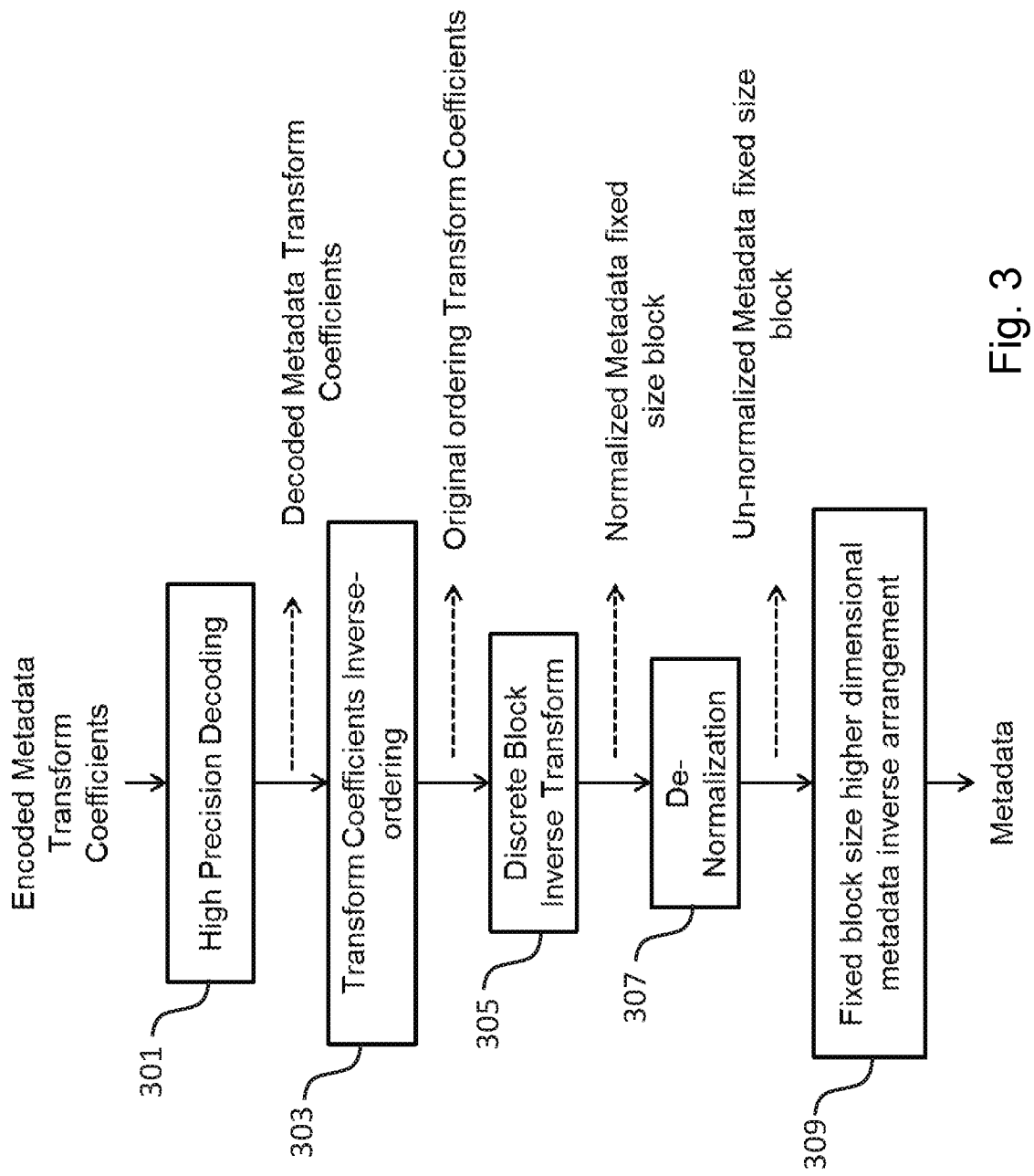
FIG. 3 shows a schematic diagram of a metadata decoding scheme implemented in an apparatus for decoding an audio signal according to an embodiment.

FIG. 3 shows a schematic diagram illustrating a corresponding metadata decoding scheme implemented in the decoding apparatus 120 according to an embodiment. As the steps 301 to 309 shown in FIG. 3 are essentially just the inverse operations of the steps 201 to 209 shown in FIG. 2, reference is made to the above description of steps 201 to 209 shown in FIG. 2 (i.e., step 301 is inverse of step 209, step 303 is inverse of step 207, step 305 is inverse of step 205, step 307 is inverse of step 203, and step 309 is inverse of step 201).

Figure 4:
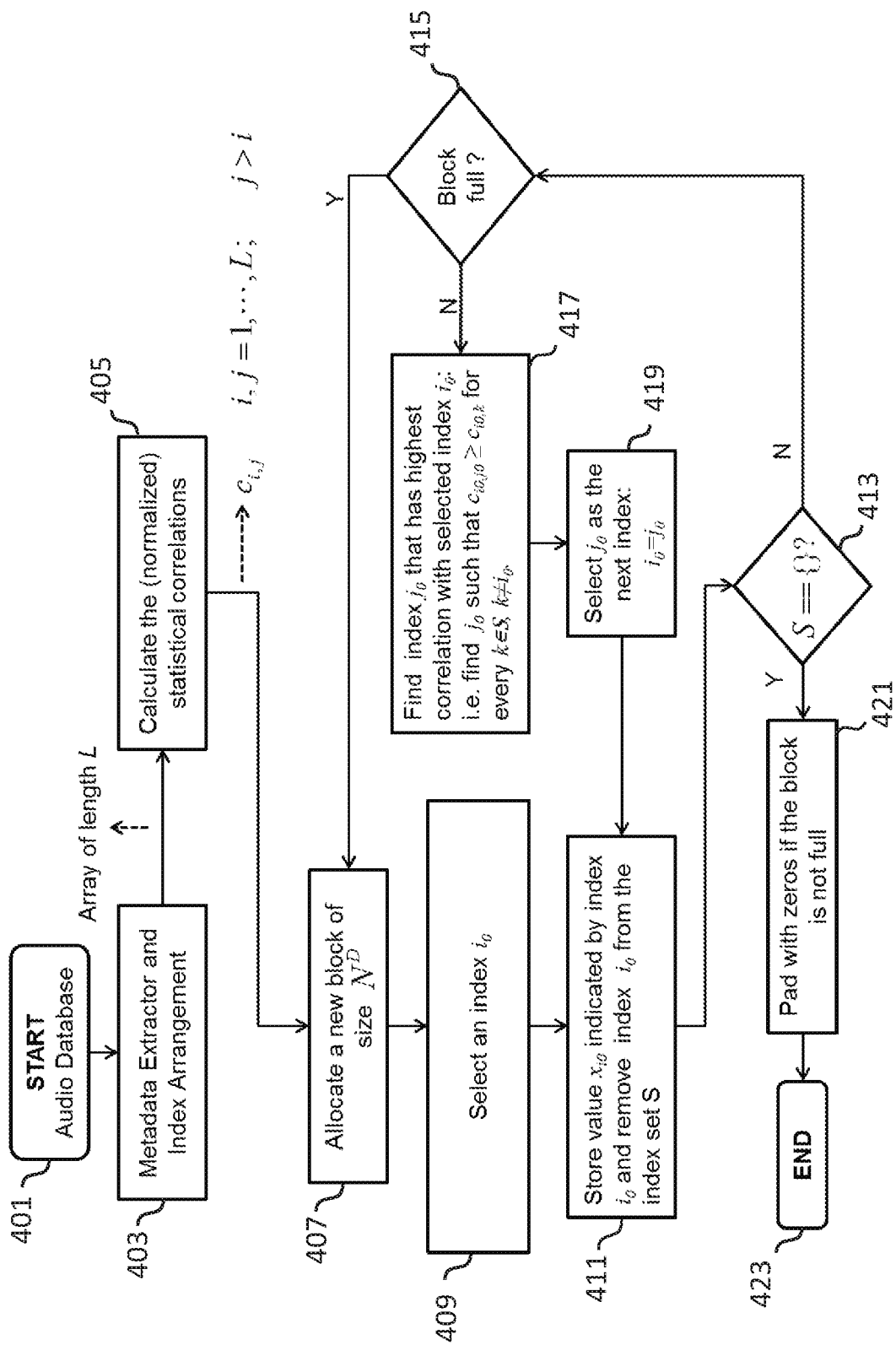
FIG. 4 shows a schematic diagram of a metadata re-arrangement scheme implemented in an encoding apparatus according to an embodiment or a decoding apparatus according to an embodiment.
Figure 5:
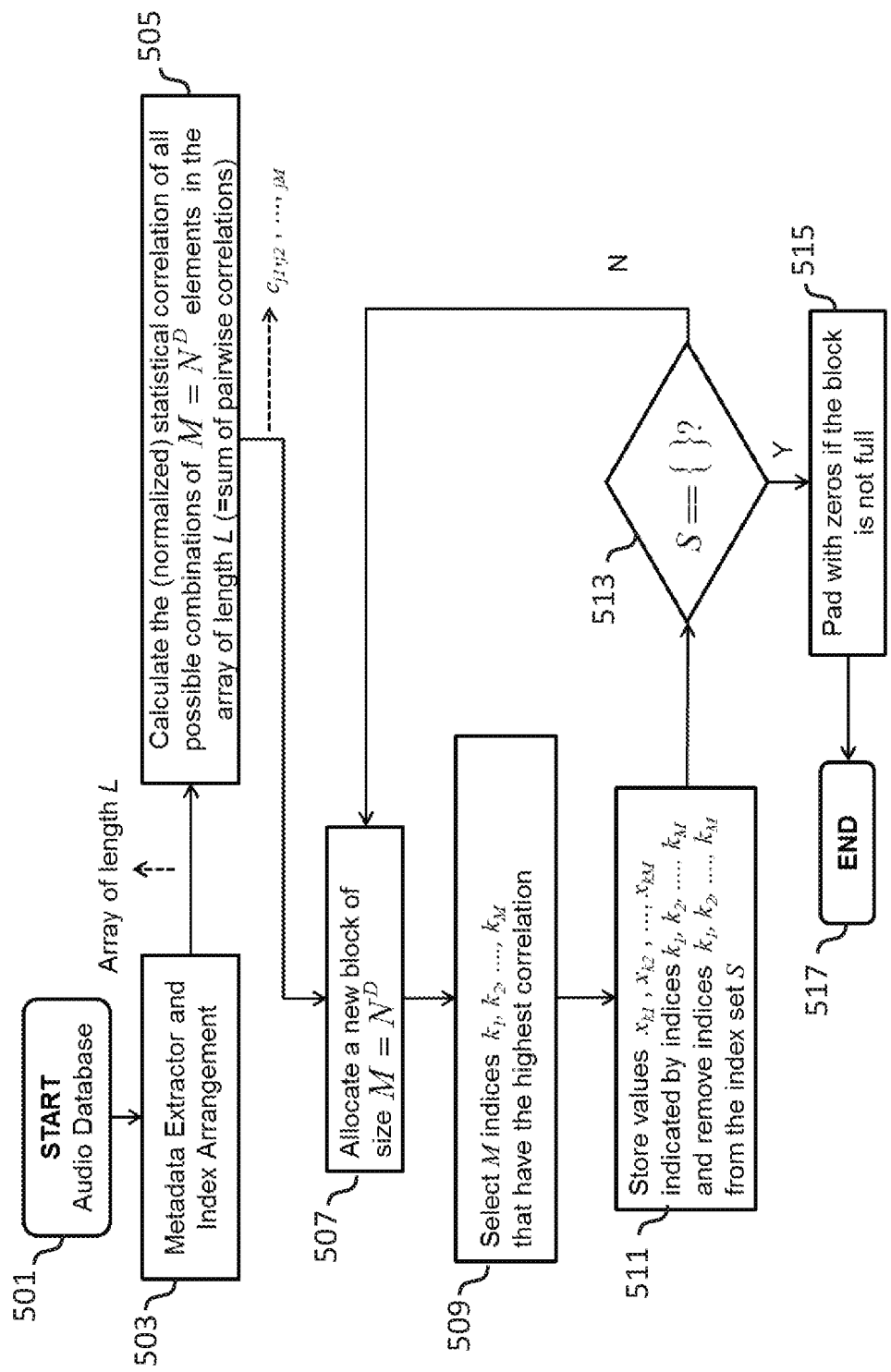
FIG. 5 shows a schematic diagram of another metadata re-arrangement scheme implemented in an encoding apparatus according to an embodiment or a decoding apparatus according to an embodiment.

FIGS. 4 and 5 show respective schematic diagrams of embodiments of metadata re-arrangement schemes implemented in the metadata re-arrangement unit 114 of the encoding apparatus 110 according to an embodiment or the metadata re-arrangement unit 124 of the decoding apparatus 120 according to an embodiment.

The metadata re-arrangement schemes shown in FIGS. 4 and 5 are based on a set of correlation values, wherein each of the correlation values is a measure for the correlation between two or more metadata elements of the plurality of metadata elements. In an embodiment, the set of correlation values used for the re-arrangement scheme implemented in the metadata re-arrangement unit 114 of the encoding apparatus 110 is derived from a set of training input audio signals. To this end, the encoding apparatus 110 can comprise a corresponding machine learning unit 116. Furthermore, the correlation values determined on the basis of the set of training input audio signals can be updated during a deployment phase, e.g., using input audio signals of the deployment phase as additional training input audio signals.

In an embodiment, the re-arrangement scheme is configured to place highly correlated metadata elements close to each other.

In an embodiment, the re-arrangement scheme is defined to minimize, at least approximately, a cost function, wherein the cost function assigns to each one of a set of candidate re-arrangement schemes a respective cost value.

In an embodiment, the cost function is a sum of powers of correlation-distance products. For example, the cost function may be defined as:

$$\Sigma_i |c_i d_i|^2,$$

wherein the index i refers to the i-th subset of metadata elements and runs over all subsets, each subset having the same number of metadata elements (e.g., two, or three, or four), $c_i$ denotes the correlation value of the i-th subset of metadata elements, and $d_i$ denotes a measure of the distances between the metadata elements of the i-th subset according to the re-arrangement scheme. In general, the cost function may also be defined as:

$$\Sigma_i |c_i d_i|^n,$$

wherein n is an integer or real number, such as n=1, 2, . . . or n=0.5, . . . .

In the context of the present disclosure, the correlation value of a subset (e.g., a pair) of metadata elements is understood to be the value of the correlation between the metadata elements of the subset. The correlation between the metadata elements of the subset may, for example, be the sum of pairwise correlations of the metadata elements of the subset.

Steps 401, 403 and 405 shown in FIG. 4 relate to deriving the set of correlation values from a set of training input audio signals (i.e., step 401: receive the set of training input audio signals from an audio database; step 403: metadata extractor and index arrangement resulting in an array of length L; step 405: calculate the (normalized) statistical correlations $c_{i,j}$, where (i, j=1, . . . L) and j>i).

In step 407 of FIG. 4 a new metadata block having $N^D$ slots for receiving metadata elements is allocated, wherein D denotes the dimension of the metadata block, for instance 2, 3 or 4, and N denotes the number of slots along one dimension of the metadata block.

In step 409 of FIG. 4 an index $i_0$ is selected for picking a first metadata element of the plurality of metadata elements to be re-arranged at least partially in the new metadata block. In an embodiment, the index $i_0$ can be pre-defined or picked randomly. In another embodiment, the index $i_0$ is selected by selecting the index being associated with the largest correlation value.

In step 411 of figure the metadata element associated with the selected index $i_0$ is stored in the metadata block and the selected index $i_0$ is removed from the set S of metadata elements, which still need to be re-arranged.

If the set S is not empty and the metadata block has not been completely filled up with metadata elements yet (steps 413 and 415), in a step 417 of FIG. 4 the metadata element with the index $j_0$ that has the highest correlation value with the metadata element with the index $i_0$ is determined. The such determined index $j_0$ becomes the new index $i_0$ and the corresponding metadata element is stored in the next free slot of the metadata block. This loop is repeated until either the S of metadata elements, which still need to be re-arranged, is empty (step 413) or the metadata block has been completely filled up with metadata elements (step 415). In the latter case a further metadata block of the same size as the first metadata block is allocated (step 407) and the above steps are performed on the basis of the further metadata block.

Once all metadata elements haven been rearranged any empty slots of the metadata block can be padded with zeros (step 421).

Steps 501, 503 and 505 shown in FIG. 5 relate to deriving the set of correlation values from a set of training input audio signals (i.e., step 501: receive the set of training input audio signals from an audio database; step 503: metadata extractor and index arrangement resulting in an array of length L; step 505: calculate the (normalized) statistical correlation of all possible combinations of $M=N^D$ elements in the array of length L (=sum of pairwise correlations) $c_{j1,j2,\ldots,jM}$). In this case, however, a correlation measure is determined in step 505 of FIG. 5 for each possible combination of M metadata elements, wherein M denotes the number of metadata elements a metadata block can receive. In an embodiment, the correlation measure for each possible combination of M metadata elements is based on the sum of the pairwise correlations of the M metadata elements.

In step 507 of FIG. 5 a new metadata block having $M=N^D$ slots for receiving metadata elements is allocated, wherein D denotes the dimension of the metadata block, for instance 2, 3 or 4, and N denotes the number of slots along one dimension of the metadata block.

In step 509 of FIG. 5 the indices of the metadata elements being part of the combination of M metadata elements having the largest correlation measure are selected.

In step 511 of FIG. 5 the corresponding metadata elements are stored in the new metadata block and the indices of these metadata elements are removed from the set S of metadata elements, which still need to be re-arranged.

As in the embodiment shown in FIG. 5 M metadata elements are selected in step 509, storing these metadata elements in step 511 in the metadata block will completely fill the metadata block. Therefore, as long as the set S of metadata elements, which still need to be re-arranged, is non-empty new metadata blocks having $M=N^D$ slots for receiving metadata elements will be allocated in step 507 and filled with combinations of metadata elements in step 511 of FIG. 5.

Once all metadata elements haven been rearranged any empty slots of the metadata block can be padded with zeros (step 515).

Figure 6:
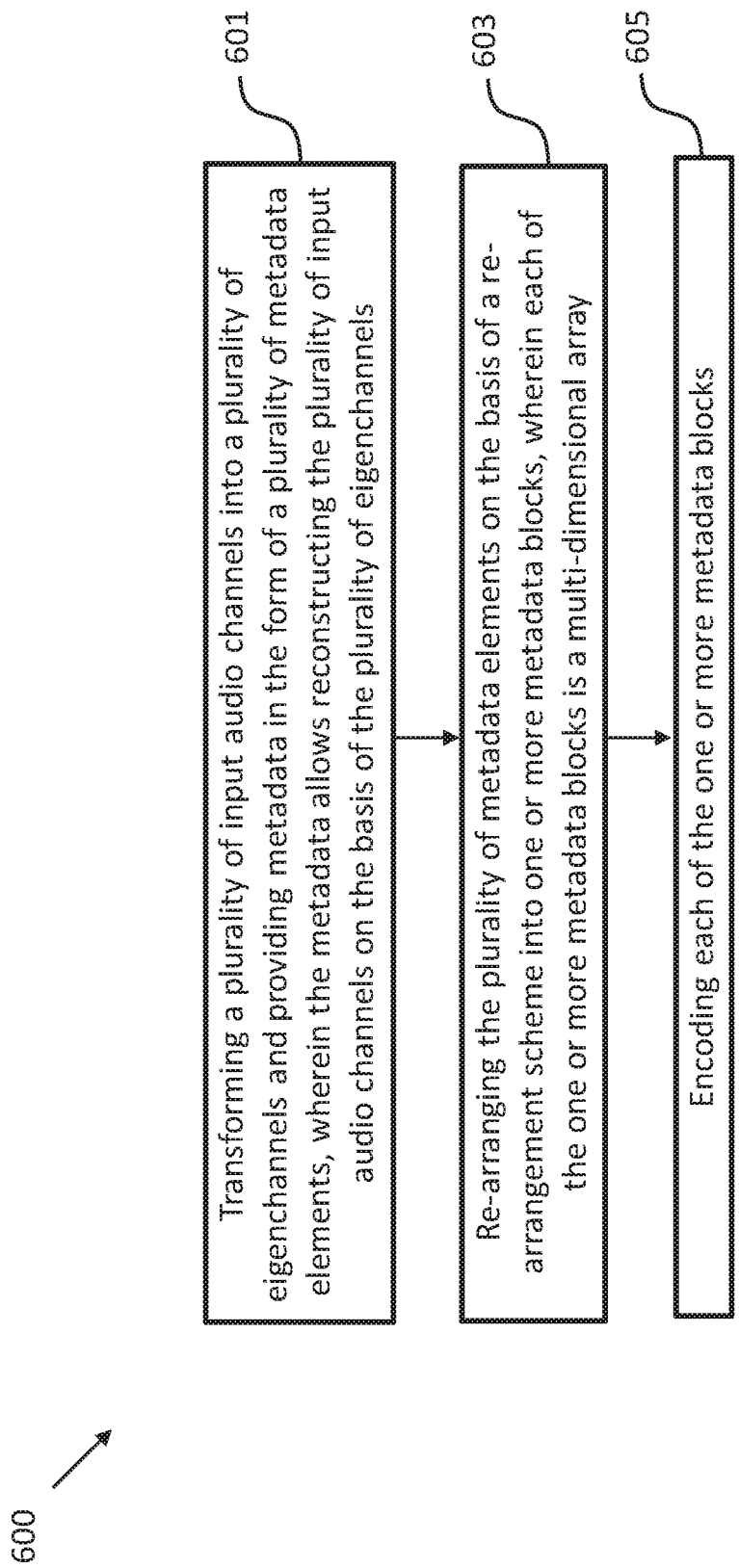
FIG. 6 shows a schematic diagram illustrating a method for encoding a multichannel audio signal according to an embodiment.

FIG. 6 shows a schematic diagram illustrating a method 600 for encoding an input audio signal, wherein the input audio signal comprises a plurality of input audio channels. The method 600 comprises: transforming 601 the plurality of input audio channels into a plurality of eigenchannels and providing metadata in the form of a plurality of metadata elements, wherein the metadata allows reconstructing the plurality of input audio channels on the basis of the plurality of eigenchannels; re-arranging 603 the plurality of metadata elements on the basis of a re-arrangement scheme into one or more metadata blocks, wherein each of the one or more metadata blocks is a multi-dimensional array; and encoding 605 each of the one or more metadata blocks.

Figure 7:
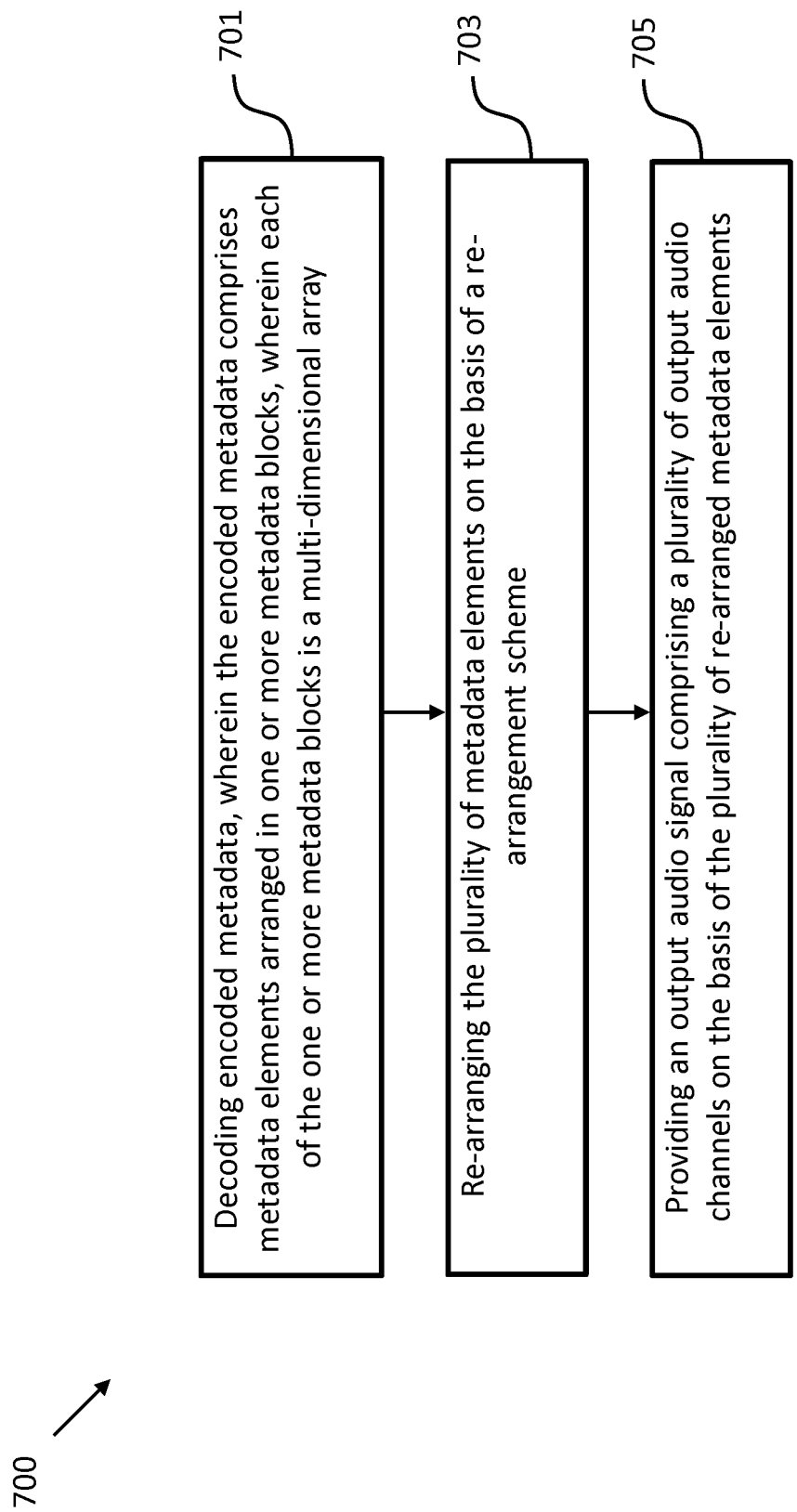
FIG. 7 shows a schematic diagram illustrating a method for decoding a multichannel audio signal according to an embodiment.

FIG. 7 shows a schematic diagram illustrating a method 700 for decoding an input audio signal, wherein the input audio signal comprises encoded metadata. The method 700 comprises: decoding 701 the encoded metadata, wherein the encoded metadata comprises metadata elements arranged in one or more metadata blocks, wherein each of the one or more metadata blocks is a multi-dimensional array; re-arranging 703 the plurality of metadata elements on the basis of a re-arrangement scheme; and providing 705 an output audio signal comprising a plurality of output audio channels on the basis of the plurality of re-arranged metadata elements.

Embodiments of the disclosure allow improving the KLT-based audio coding compression rate by transferring the process into a higher dimensional domain (e.g., 2-D/3-D). By exploiting this domain, embodiments of the disclosure provide, amongst others, the following advantages. Embodiments of the disclosure provide scalability given an arbitrary number of multichannel input audio signals, since the compression operates in relatively small fixed size blocks of data. Embodiments of the disclosure allow a straightforward implementation and can re-use existing 2-D/3-D signal processing tools. Embodiments of the disclosure allow encoding of high-precision numerical data.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. An apparatus for encoding a signal, the apparatus comprising:
   one or more processors configured to:
      receive an input audio signal, wherein the input audio signal comprises a plurality of input audio channels;
      transform the plurality of input audio channels into a plurality of eigenchannels;
      generate metadata comprising a plurality of metadata elements based on the plurality of eigenchannels, wherein the metadata allows reconstructing the plurality of input audio channels based on the plurality of eigenchannels;
      perform a re-arrangement scheme to re-arrange the plurality of metadata elements into one or more metadata blocks, wherein each of the one or more metadata blocks comprises a multi-dimensional array, wherein the re-arrangement scheme is based on a set of correlation values, wherein each correlation value of the set of correlation values is a value of a correlation between two or more metadata elements of the plurality of metadata elements, wherein the re-arrangement scheme is configured to minimize a cost function, and wherein the cost function assigns to each one of a set of candidate re-arrangement schemes a respective cost value; and
      encode each of the one or more metadata blocks.

2. The apparatus of claim 1, wherein the one or more processors are further configured to determine the set of correlation values based on a set of training input audio signals.

3. The apparatus of claim 1, wherein the re-arrangement scheme is configured to place more correlated metadata elements closer together than less correlated metadata elements.

4. The apparatus of claim 1, wherein the cost function is a sum of powers of correlation-distance products.

5. The apparatus of claim 1, wherein the re-arrangement scheme comprises one or more iterations of the following sequence of operations:
   defining a set of remaining metadata elements, the set of remaining metadata elements comprising those metadata elements of the plurality of metadata elements that remain to be re-arranged;
   selecting, from the set of remaining metadata elements, the subset of M metadata elements that has the highest correlation value, wherein M is greater than or equal to 2; and
   re-arranging the selected subset of M metadata elements into one of the one or more metadata blocks.

6. The apparatus of claim 5, wherein each of the metadata blocks comprises M elements.

7. The apparatus of claim 1, wherein performing the re-arrangement scheme comprises:
   selecting a first metadata element from the plurality of metadata elements; and
   re-arranging the first metadata element into a first one of the one or more metadata blocks; and
   one or more iterations of the following sequence of operations:
      defining a set of remaining metadata elements, the set of remaining metadata elements consisting of those metadata elements of the plurality of metadata elements that remain to be re-arranged;
      selecting, in the first metadata block, a free position next to an occupied position;
      selecting, from the set of remaining metadata elements, the metadata element that is most highly correlated with the metadata element at the occupied position; and
      re-arranging the selected metadata element into the selected free position.

8. The apparatus of claim 1, wherein the one or more processors are further configured to:
   for each of the one or more metadata blocks, apply a discrete block transform to the respective metadata block, thereby generating a plurality of transform coefficients of the respective metadata block; and
   encode the plurality of transform coefficients.

9. The apparatus of claim 8, wherein the one or more processors are further configured to:
   for each of the one more metadata blocks, re-arrange the plurality of transform coefficients of the respective metadata block, based on the respective magnitudes of the plurality of transform coefficients, thereby providing a sequence of transform coefficients; and
   encode the sequence of transform coefficients.

10. The apparatus of claim 8, wherein the discrete block transform is a discrete cosine transform (DCT), a discrete sine transform (DST), or a discrete Fourier transform (DFT).

11. An apparatus for decoding a signal, comprising:
    one or more processors configured to:
       receive an input audio signal comprising encoded metadata;
       decode the encoded metadata, wherein the encoded metadata comprises metadata elements arranged in one or more metadata blocks, wherein each metadata block of the one or more metadata blocks comprises a multi-dimensional array;
       perform a re-arrangement scheme to re-arrange the plurality of metadata elements into a plurality of re-arranged metadata elements, wherein the re-arrangement scheme is configured to minimize a cost function, and wherein the cost function assigns to each one of a set of candidate re-arrangement schemes a respective cost value; and
       provide an output audio signal comprising a plurality of output audio channels based on the plurality of re-arranged metadata elements.

12. A method for encoding a signal, the method comprising:

receiving an input audio signal, wherein the input audio signal comprises a plurality of input audio channels;

transforming the plurality of input audio channels into a plurality of eigenchannels;

generating metadata comprising a plurality of metadata elements based on the plurality of eigenchannels, wherein the metadata allows reconstructing the plurality of input audio channels based on the plurality of eigenchannels;

performing a re-arrangement scheme to re-arrange the plurality of metadata elements into one or more metadata blocks, wherein each of the one or more metadata blocks comprises a multi-dimensional array, wherein the re-arrangement scheme is based on a set of correlation values, wherein each correlation value of the set of correlation values is a value of a correlation between two or more metadata elements of the plurality of metadata elements, wherein the re-arrangement scheme is configured to minimize a cost function, and wherein the cost function assigns to each one of a set of candidate re-arrangement schemes a respective cost value; and encoding each of the one or more metadata blocks.

13. A non-transitory memory storing computer-executable program code that, when executed by a computer, causes the computer to perform the method of claim 12.

14. A method for decoding a signal, the method comprising:

receiving an input audio signal comprising encoded metadata;

decoding the encoded metadata, wherein the encoded metadata comprises metadata elements arranged in one or more metadata blocks, wherein each metadata block of the one or more metadata blocks comprises a multi-dimensional array;

performing a re-arrangement scheme to re-arrange the plurality of metadata elements into a plurality of re-arranged metadata elements, wherein the re-arrangement scheme is configured to minimize a cost function, and wherein the cost function assigns to each one of a set of candidate re-arrangement schemes a respective cost value; and providing an output audio signal comprising a plurality of output audio channels based on the plurality of re-arranged metadata elements.

15. A non-transitory memory storing computer-executable program code that, when executed by a computer, causes the computer to perform the method of claim 14.

* * * * *